United States Patent
Goetsch et al.

(10) Patent No.: US 11,673,594 B2
(45) Date of Patent: Jun. 13, 2023

(54) SWING CASTER DOLLY

(71) Applicants: Daniel B Goetsch, Upland, CA (US); Clint Griffith, Lucerne Valley, CA (US)

(72) Inventors: Daniel B Goetsch, Upland, CA (US); Clint Griffith, Lucerne Valley, CA (US)

(73) Assignee: Daniel B. Goetsch, Upland, CA (US)

( * ) Notice: Subject to any disclaimer, the term of this patent is extended or adjusted under 35 U.S.C. 154(b) by 181 days.

(21) Appl. No.: 17/237,883

(22) Filed: Apr. 22, 2021

(65) Prior Publication Data

US 2022/0340186 A1    Oct. 27, 2022

(51) Int. Cl.
B62B 5/00    (2006.01)

(52) U.S. Cl.
CPC .......... *B62B 5/0086* (2013.01); *B62B 5/0089* (2013.01)

(58) Field of Classification Search
CPC ... B62B 5/0083; B62B 5/0086; B62B 5/0089; B60B 33/066
See application file for complete search history.

(56) References Cited

U.S. PATENT DOCUMENTS

| | | | |
|---|---|---|---|
| 1,014,992 A | 1/1912 | Ames | |
| 2,779,049 A | 1/1957 | Hoddevik | |
| 3,295,482 A | 1/1967 | Dountas | |
| 3,533,640 A * | 10/1970 | Fator | B62B 5/0083 280/35 |
| 3,625,381 A | 12/1971 | Menzi | |
| 3,685,125 A | 8/1972 | DePierre | |
| 4,664,398 A | 5/1987 | Mozer | |
| 4,690,605 A | 9/1987 | Coccaro | |
| 4,692,082 A | 9/1987 | Smith | |
| 4,799,656 A | 1/1989 | Puskarich | |
| 4,854,803 A | 8/1989 | Coccaro | |
| 5,005,848 A * | 4/1991 | Cornell | B62B 5/0083 403/295 |
| 5,018,930 A * | 5/1991 | Hardin | B62B 5/0083 254/8 R |
| 5,044,645 A | 9/1991 | Eltvik | |
| 5,112,070 A | 5/1992 | Hahn | |
| 5,253,389 A | 10/1993 | Colin | |
| 5,375,294 A * | 12/1994 | Garrett | B60B 33/06 16/34 |
| 5,465,985 A | 11/1995 | Devan | |
| 5,575,036 A | 11/1996 | May | |
| 5,628,522 A | 5/1997 | Hall | |
| 5,732,960 A * | 3/1998 | Elam | B60B 29/002 254/113 |

(Continued)

*Primary Examiner* — Jeffrey J Restifo
(74) *Attorney, Agent, or Firm* — Manuel de la Cerra

(57) ABSTRACT

A wheel dolly is disclosed that includes a first and a second swing caster assembly. Each swing caster assembly includes a stationary frame supporting a swing axle and a lift bar channel, a swing frame constructed to rotate about the swing axle, thus defining a swing plane, and a swivel caster connected to the swing frame. A lift bar with a first longitudinal member extending orthogonally away from a second longitudinal member is connected to both swing caster assemblies through the lift bar channel. The swing plane of the first swing caster assembly is orthogonal to the swing plane of the second swing caster assembly, when the assemblies are mounted to the lift arm.

21 Claims, 19 Drawing Sheets

(56) References Cited

U.S. PATENT DOCUMENTS

| | | | |
|---|---|---|---|
| 5,893,571 A * | 4/1999 | Nowell | B60B 29/002 |
| | | | 280/413 |
| 6,109,625 A * | 8/2000 | Hewitt | F16M 11/22 |
| | | | 280/43.24 |
| 6,179,542 B1 | 1/2001 | Haven | |
| 6,789,994 B2 | 9/2004 | Tortellier | |
| 6,863,489 B2 * | 3/2005 | Grubbs | B62B 5/0083 |
| | | | 414/812 |
| 7,097,406 B1 | 8/2006 | Gang | |
| 7,530,581 B1 | 5/2009 | Squires | |
| 8,657,305 B1 * | 2/2014 | Hassell | B60P 3/127 |
| | | | 280/43.21 |
| 8,657,306 B2 | 2/2014 | Chiu | |
| 8,910,957 B1 | 12/2014 | Hassell | |
| 9,145,154 B1 | 9/2015 | Horowitz | |
| 9,358,995 B2 | 6/2016 | Allos | |
| 9,557,000 B2 | 1/2017 | Chang | |
| 9,573,420 B2 | 2/2017 | Hedley | |
| 10,105,988 B1 | 10/2018 | Frankel | |
| 10,279,827 B1 * | 5/2019 | Mason | B60B 29/002 |
| 10,632,787 B1 * | 4/2020 | Goetsch | B62B 3/0606 |
| D897,065 S * | 9/2020 | Goetsch | D34/28 |
| 2003/0137130 A1 | 7/2003 | Chang | |
| 2004/0227316 A1 * | 11/2004 | Drummond | B60B 33/0023 |
| | | | 280/79.11 |
| 2005/0017470 A1 * | 1/2005 | Abbott | B60P 3/127 |
| | | | 280/79.4 |
| 2006/0103092 A1 * | 5/2006 | Strahler | B62B 5/0083 |
| | | | 280/79.11 |
| 2006/0231674 A1 * | 10/2006 | Lin | B62B 5/0083 |
| | | | 242/615.2 |
| 2009/0309331 A1 | 12/2009 | Ryan | |
| 2010/0129186 A1 * | 5/2010 | Foote | B62B 5/0083 |
| | | | 414/812 |
| 2017/0166006 A1 * | 6/2017 | Willis | B60B 33/0049 |
| 2017/0210437 A1 * | 7/2017 | Black | B60B 19/003 |
| 2017/0259839 A1 * | 9/2017 | Adams | B62B 5/0083 |
| 2017/0282778 A1 * | 10/2017 | Young, Jr. | B62B 3/102 |
| 2019/0009809 A1 * | 1/2019 | Newenhouse | B62B 5/0086 |
| 2019/0365105 A1 * | 12/2019 | Schellenberg | A47C 7/006 |
| 2022/0340186 A1 * | 10/2022 | Goetsch | B62B 5/0086 |

* cited by examiner

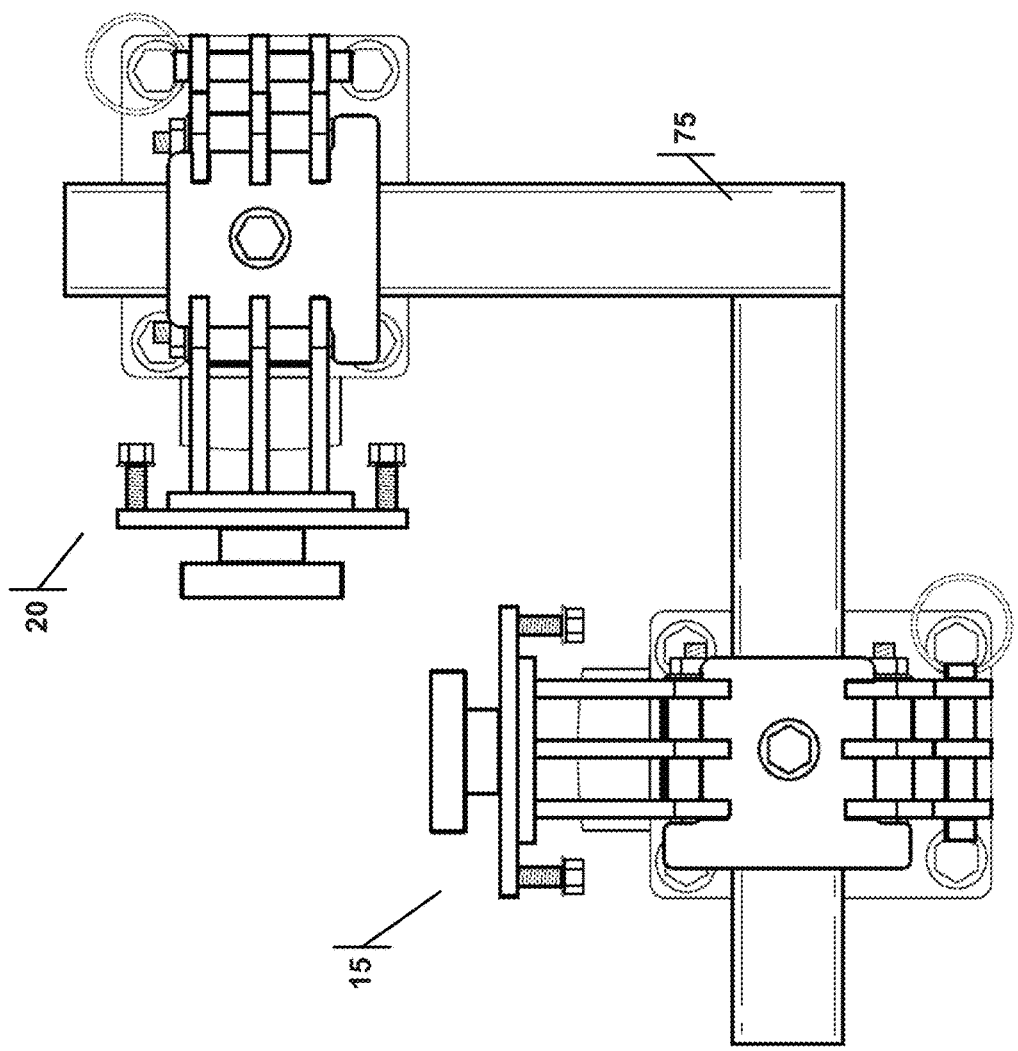
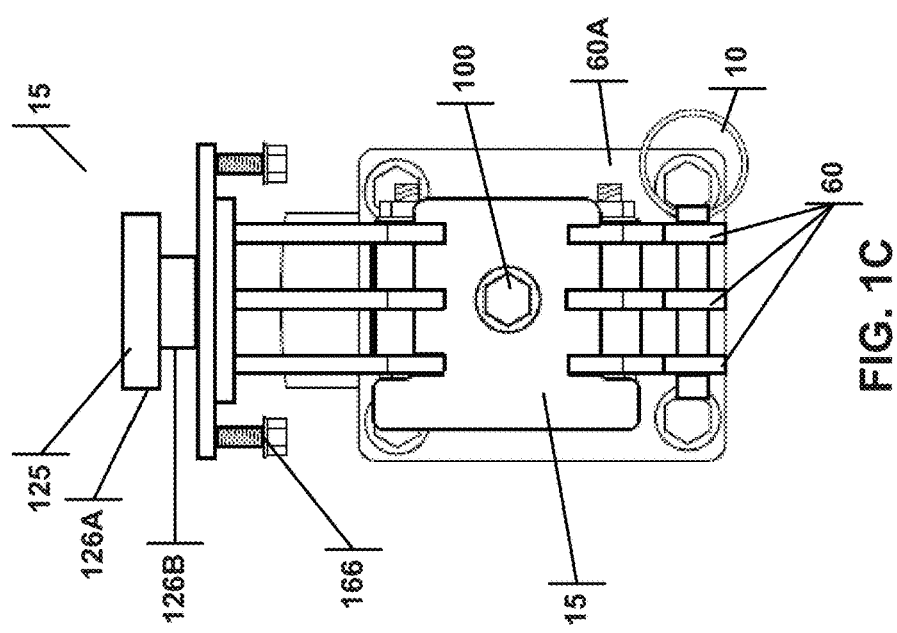
FIG. 1C
FIG. 1D

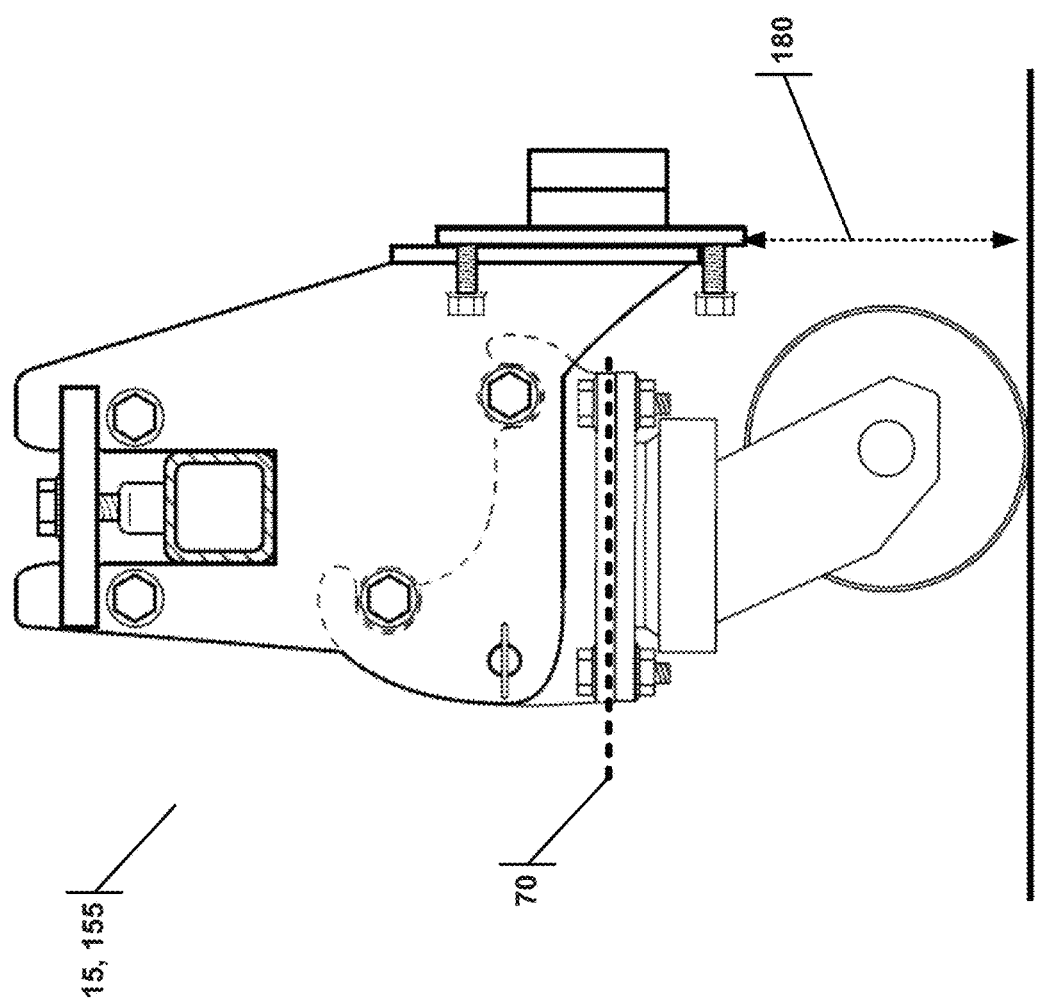

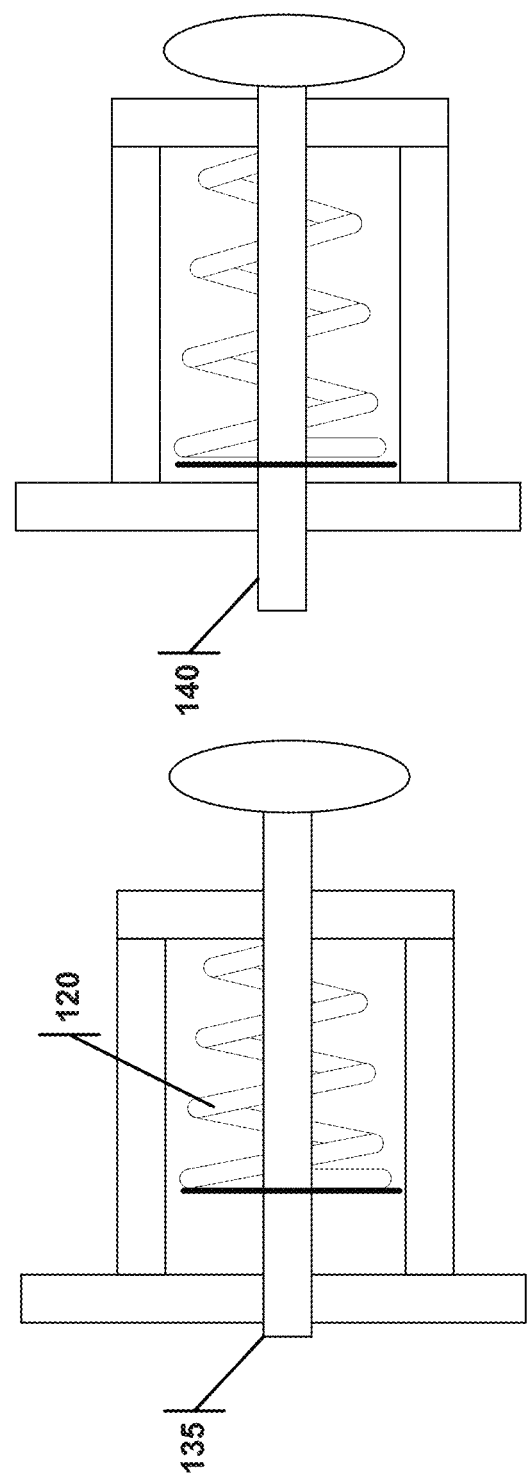

SWING CASTER DOLLY

1.0 CROSS-REFERENCE TO RELATED APPLICATIONS

This application is related to U.S. provisional application 62/843,905, titled Wheel Dolly, filed on May 6, 2019; to U.S. design application 29/690190, titled Wheel Dolly, filed on May 6, 2019; and to U.S. patent application Ser. No. 16/407,804 titled Wheel Dolly, filed on May 9, 2019. All of these applications are incorporated herein by reference in their entireties.

2.0 FIELD OF THE INVENTION

This invention relates to tools used to lift cargo containers and other heavy objects.

3.0 BACKGROUND

Cargo shipping containers generally have eight corner mounting blocks 130 with two slot types, as shown in FIG. 7. A top/bottom slot (1 per block) is a 3"×4" connector called a "Hammer" or a "TwistLock". This is the most common connector, as it enables the stacking of cargo shipping containers on top of each other on boats 10 high. The corner blocks also have side slots (2 per corner), which are 2"×3". These side slots are primarily used to access the top/bottom slot, but can also be used to connect to or mount to the corner mounting block 130 of the cargo container, using a "LUGS" connector that can be used to pick up and to move the cargo shipping container.

Current state-of-the-art wheel dollies are simply not robust enough to lift the weight of a cargo container. Moreover, these dollies require their own hydraulic lift mechanism to ultimately raise heavy objects from the floor. For example, U.S. Pat. No. 3,653,527 discloses a wheel dolly with an integrated hydraulic jack used to raise the wheel. Likewise, U.S. Pat. No. 4,050,597 discloses a similar jack system. The problem with these integrated jack systems is that they are heavy because of the additional weight from the dedicated jack system. They are also expensive for the same reason.

Other wheel dollies use a threaded bolt system to create the lift needed to raise the object. For example, U.S. Pat. No. 7,597,524 discloses a parallelogram lift system with a bolt that is turned to raise the wheels. U.S. Pat. No. 7,232,138 teaches a long bolt that, when turned, brings two arms in contact with the object, and, as the bolt is further turned, the arms lift the wheel. These systems, too, have shortcomings. It can be very taxing to turn a bolt sufficiently to raise an object that weights several tons. Also, it can be unsafe to require a user to be so close to the object dolly with manual tools when lifting. Wheel dollies can fail for a variety of reasons, and a user should not be close to the dolly when such a failure occurs.

To meet these deficiencies, the art has turned to massive cranes, hoists and specialized heavy jacks. These solutions are expensive, heavy and complicated.

What is therefore needed is a wheel dolly that overcomes these deficiencies, and allows for lifting and easy movement of cargo shipping containers.

4.0 SUMMARY

The present invention provides an elegant solution to the needs described above and offers numerous additional benefits and advantages, as will be apparent to persons of skill in the art. In particular, a wheel dolly is disclosed that includes a first and a second swing caster assembly. Each swing caster assembly includes a stationary frame supporting a swing axle and a lift bar channel, a swing frame constructed to rotate about the swing axle, thus defining a swing plane, and a caster connected to the swing frame. The caster may be a swivel caster. A lift bar with a first longitudinal member extending orthogonally away from a second longitudinal member is connected to both swing caster assemblies through the lift bar channel. The swing plane of the first swing caster assembly is orthogonal to the swing plane of the second swing caster assembly when the assemblies are mounted to the lift arm.

The lift bar is constructed to allow the first swing caster assembly to slide along the lift bar independently of the second swing caster assembly. The first and second swing caster assemblies may each further include a lift bar locking plate and a lift bar locking bolt, wherein the locking plate and bolt are capable of locking the position of the swing caster assembly relative to that of the lift bar. Loosening the lift bar locking bolt allows the swing caster assembly to slide along the lift bar, and tightening the lift bar locking bolt fixes the position of the swing caster assembly relative to that of the lift bar.

The stationary frame may include at least three parallel plates, and those plates may be identical. The swing frame may include at least two parallel plates. When the stationary frame includes three parallel plates, two swing frame parallel plates can be interleaved with the three stationary frame parallel plates, resulting in a strong super structure.

The first and second swing caster assemblies may also include a keyed nub adapted to be detachably fixed to a corner mounting block of a cargo container. The keyed nub may transfer the lift force from the wheel dolly to the cargo container.

The first and second swing caster assemblies may also include a locking pin that prevents the rotation of the swing frame relative to the stationary frame; that locking pin may be spring-loaded and may automatically lock.

Also disclosed is a wheel dolly for raising a cargo container containing a corner mounting block off of a floor or a horizontal surface by operation of an external jack that provides force in a direction orthogonal to the floor or horizontal surface. The wheel dolly includes a first and a second swing caster assembly. Each swing caster assembly includes a keyed nub adapted to be detachably fixed to the corner mounting block of the cargo container, a stationary frame supporting a swing axle and a lift bar channel, a swing frame constructed to rotate about the swing axle, and a caster connected to the swing frame, the caster defining a swivel plane. A lift bar is connected to both swing caster assemblies through the lift bar channel. The wheel dolly can transition between two configurations: a lowered configuration, wherein the swivel plane is not parallel to the floor; and a raised configuration, wherein the swivel plane is substantially parallel to the floor, and wherein the keyed nub of each swing caster assembly is detachably fixed to the corner block. The transition between the lowered configuration and the raised configuration is achieved by the operation of the external jack to raise the lift bar.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 1C is a top view of a swing caster assembly.

FIG. 1D is a top view of the assembled wheel dolly.

FIG. 2C is a side view of the wheel dolly in a raised configuration.

FIG. 3A illustrates a spring-loaded locking pin that is in the unlocked position.

FIG. 3B illustrates a spring-loaded locking pin that is in the locked position.

6.0 DETAILED DESCRIPTION

Figure 1A:
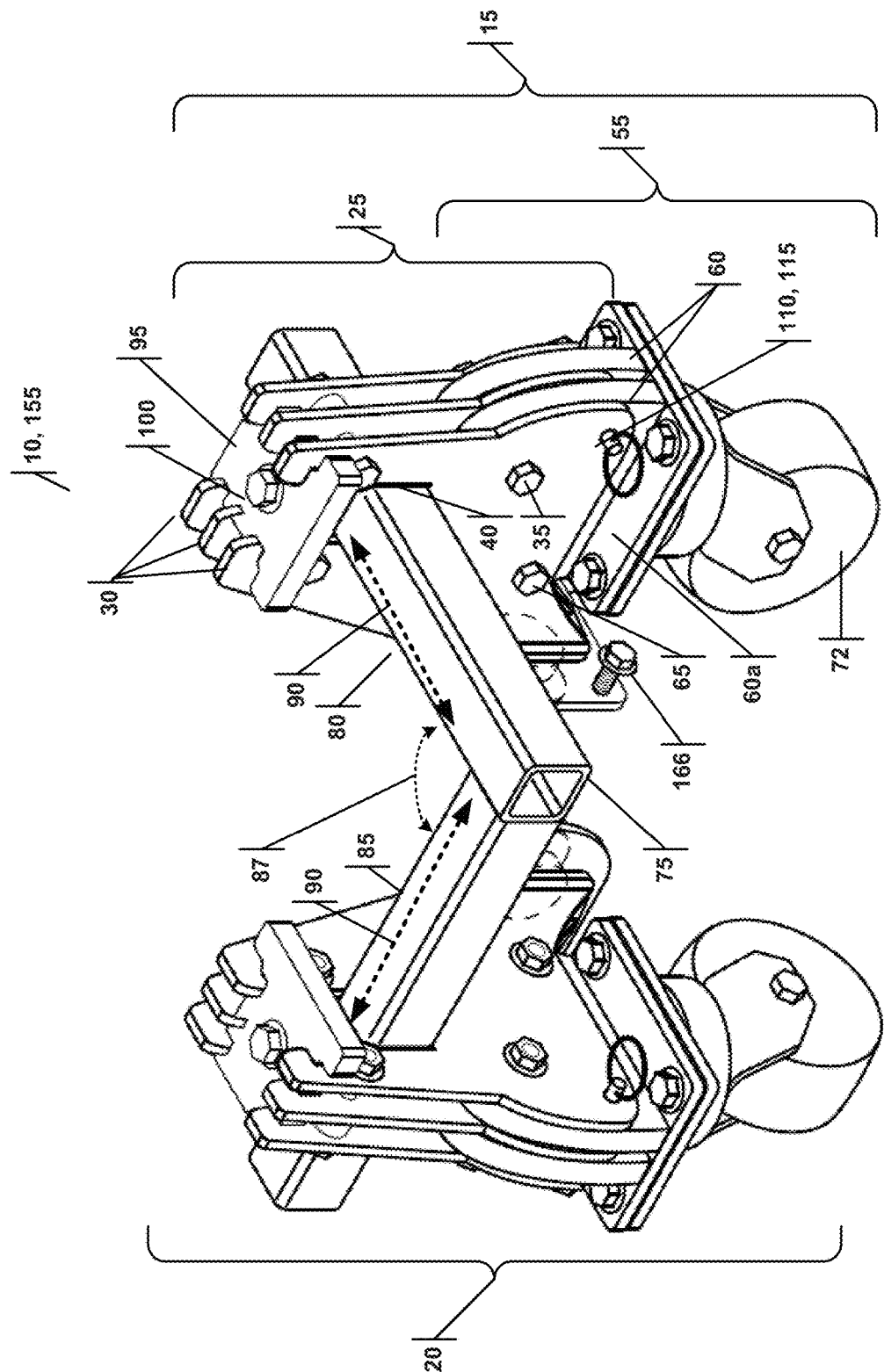
FIG. 1A is a perspective view of a wheel dolly in a raised configuration.
Figure 1B:
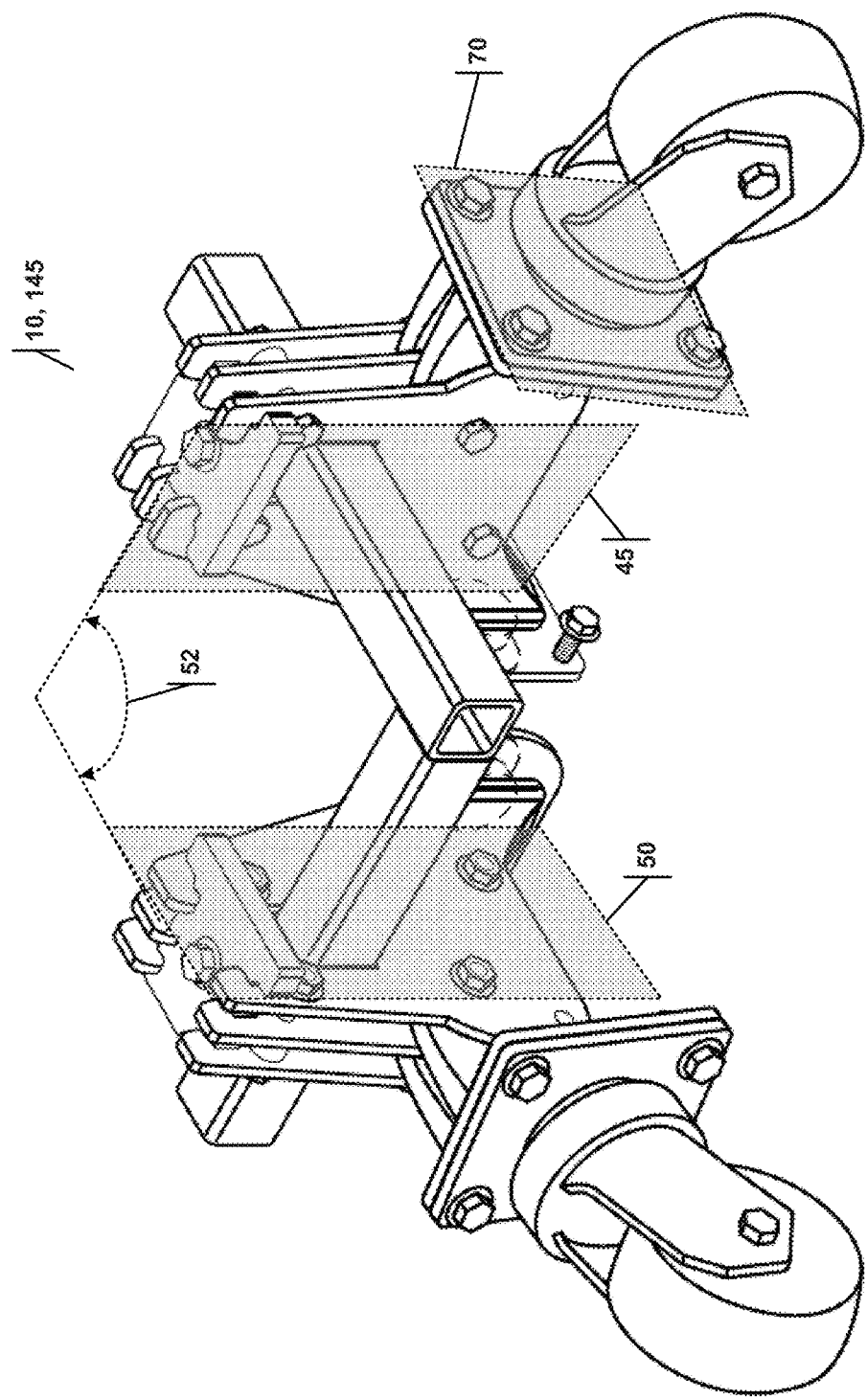
FIG. 1B is a perspective view of the wheel dolly in a lowered configuration, highlighting the orthogonality of the swing planes, and also highlighting the swivel plane.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

Wheel dolly (orthogonal lift bar) 10
Wheel dolly (straight lift bar) 10A
A first swing caster assembly 15
A second swing caster assembly 20
A third swing caster assembly 15-1

A fourth swing caster assembly 20-1
Stationary frame 25
Stationary frame parallel plates 30
Swing axle 35
Lift bar channel 40
First caster assembly swing plane 45
Second caster assembly swing plane 50
Swing plane orthogonal orientations 52
Swing frame 55
Rotation of swing frame 57
Swing frame parallel plates 60
Swing frame connection plate 60a
Alternate design for swing frame parallel plates 61
Swing axle notch 62
Swing stop notch 63
Reinforcement hole 64a
Reinforcement bolt 64b
Swing stop 65
Swivel plane 70
Caster 72
Lift bar 75
Straight lift bar 76
Lifting force 77
Gusset plate 78
First longitudinal member 80
Second longitudinal member 85
Orthogonal connection 87
Swing caster assembly sliding directions 90
Lift bar locking plate 95
Lift bar locking bolt 100
Lift bar locking pressure bushing 105
Locking pin 110
Locking pin hole 115
Locking pin spring 120
Keyed nub 125
Flared portion 126A
Necked portion 126B
Cargo container 127
Cargo container corner mounting block 130
Mounting block slot 132
Mounting block interior surface 133
Locking pin unlocked position 135
Locking pin locked position 140
Lowered configuration 145
Intermediate configuration 150
Raised configuration 155
Swing casters bolts/nuts 160
Bushings/Spacers 165
Set screw 166
Support connection bar 167
Bolts 168
Support area 169
Floor jack 170
Floor 175
Ground clearance 180

Referring to FIGS. 1A through 1D, a wheel dolly 10 is shown that includes a first swing caster assembly 15 and a second swing caster assembly 20. Each swing caster assembly includes a stationary frame 25 supporting a swing axle 35 and a lift bar channel 40. A swing frame 55 is constructed to rotate about the swing axle 35, thus defining a swing plane 45, 50, and a caster 72 is connected to the swing frame 55. The caster 72 may be a swivel caster. A lift bar 75 with a first longitudinal member 80 extending orthogonally 87 away from a second longitudinal member 85 is connected to both swing caster assemblies 15, 20 through the lift bar channels 40. The swing plane of the first swing caster assembly 45 is orthogonal 52 to the swing plane of the second swing caster assembly 50, when the assemblies 15, 20 are mounted to the lift arm 75.

The lift bar 75 is constructed to allow either of the swing caster assemblies 15, 20 to slide along the lift bar 75 (shown by arrows 90) independently of the other assembly. The first and second swing caster assemblies 15, 20 may each further include a lift bar locking plate 95, a lift bar locking bolt 100 and a lift bar locking pressure bushing 105. By tightening the lift bar locking bolt 100, the lift bar locking pressure bushing 105 places pressure on the lift bar 75, locking the position of the swing caster assembly 15, 20 relative to that of the lift bar 75. Loosening the lift bar locking bolt 100 allows the swing caster assembly 15, 20 to slide along the lift bar 75 (see arrows 90). The stationary frame 25 may be constructed of three parallel plates 30. These plates 30 may be identical to simplify manufacturing. The swing frame 55 may include at least two parallel plates 60 that may be connected to an orthogonally disposed swing frame connection plate 60a. The swing frame plates 60 may also be identical to each other to simplify manufacturing. The swing frame parallel plates 60 may be interleaved with the stationary frame parallel plates 30. The interleaving provides greater torsional strength to the wheel dolly 10. FIGS. 1C and 1D illustrate the keyed nub 134 that can be inserted into the corner mounting block of a cargo container, and the set screw 166 that can be tightened to make a more stable connection to the corner mounting block. The keyed nub 134 may be a LUG connector that inserts into the side slot of the corner mounting block, as described below, and may include a flared portion 126A and a necked portion 126B that assist in a secure mount.

Figure 2A:
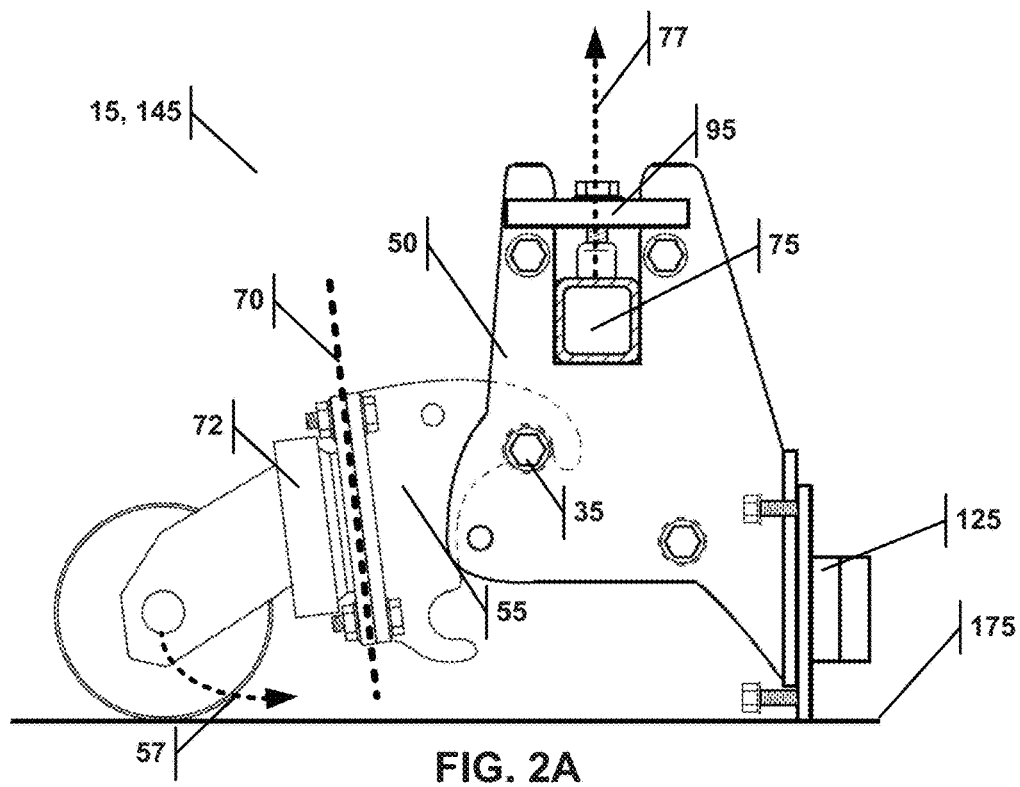
FIG. 2A is a side view of the wheel dolly in a lower configuration.
Figure 2B:
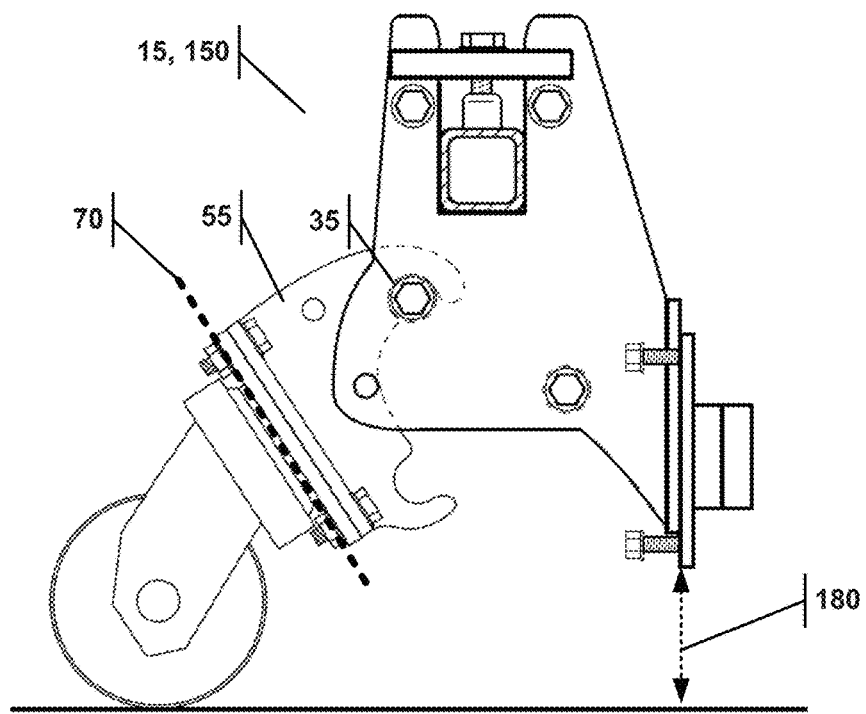
FIG. 2B is a side view of the wheel dolly in an intermediate configuration.

FIGS. 2A through 2C illustrates the transition of the wheel dolly from the lowered configuration 145 (FIG. 2A), to the intermediate configuration 150 (FIG. 2B) and to the raised configuration 155 (FIG. 2C). Specifically, FIG. 2A illustrates the swing caster assembly 15 that includes a stationary frame 50 supporting a swing axle 35. A swing frame 55 rotates about the swing axle 35 along the arc shown by arrow 57. A caster 72 is connected to the swing frame 55, and the caster 72 defines a swivel plane 70 in which the caster wheel can swivel if a swivel caster is used. When a non-swivel caster is used, the swivel plane 70 may be the plane defined by the connection of the non-swivel caster 72 to the swing frame 55 (i.e. the plane defined by the swing frame connection plate 60a). FIG. 2A illustrates the lowered configuration 145 of the wheel dolly, characterized by the condition that the swivel plane 70 is not parallel to the plane of the floor 175. In this configuration, it is possible to lift the swing frame 55 off of the axle 35, thereby completely separating the swing frame 55 and the caster 72 from the swing caster assembly 15. Detaching these components from the swing caster assembly 15 allows the dolly 10 to become more compact for storage and transport. Also shown in FIG. 2A is a keyed nub 125 adapted to be detachably fixed to a corner mounting block of a cargo container.

When a lift force 77 is applied to the lift bar 75, the dolly 10 transitions to the intermediate configuration 150 shown in FIG. 2B, wherein the cargo container (not shown) now has a ground clearance 180. The lifting force 77 may be provided by a floor jack 175 (shown in FIGS. 5D and 5F). Continuing to lift the lift bar 75 transitions the dolly 10 to the raised configuration 155 shown in FIG. 2C, which has an even greater ground clearance 180 than in the intermediate configuration (FIG. 2B). Specifically, after applying the lift force 77, the swing frame 55 is able to rotate about the swing axle 35, ultimately being stopped by the swing stop 65. The raised configuration 155 is characterized by the condition that the swivel plane 70 (or the plane defined by the swing frame connection plate 60a) is substantially parallel to the plane of the floor 175. In operation, the swing frame 55 rotates about the swing axle 35 due to the force of gravity, thereby transitioning the wheel dolly 10 to the raised configuration 155.

Figure 2D:
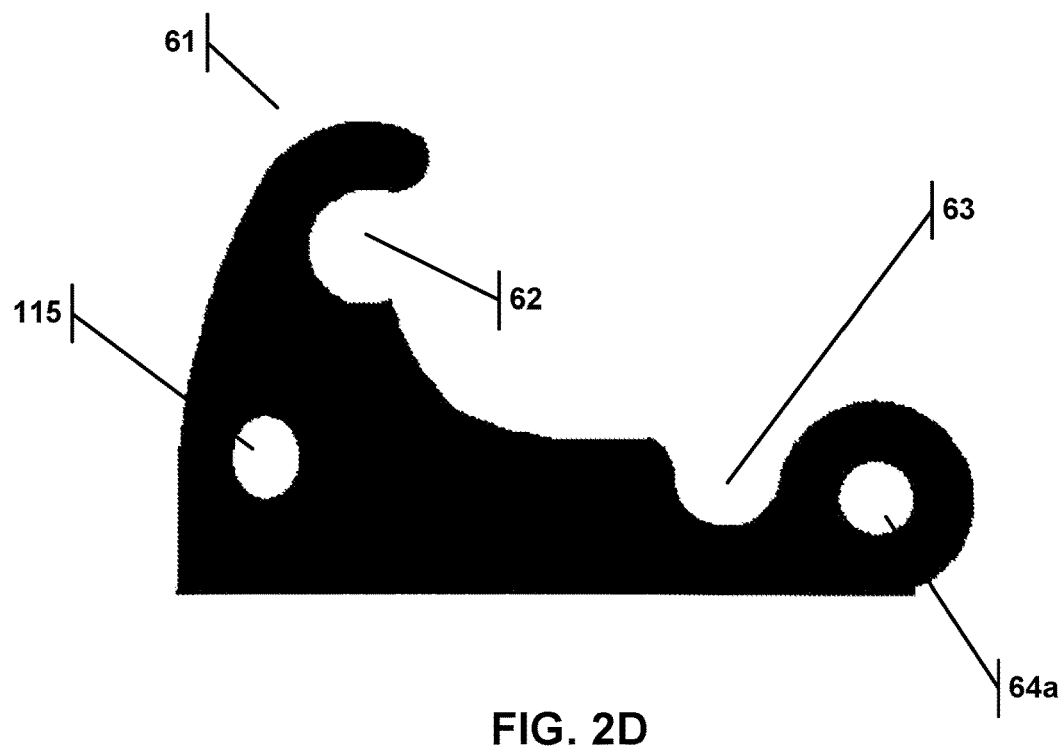
FIG. 2D is a side view of an alternate design of the swing frame plates.
Figure 2E:
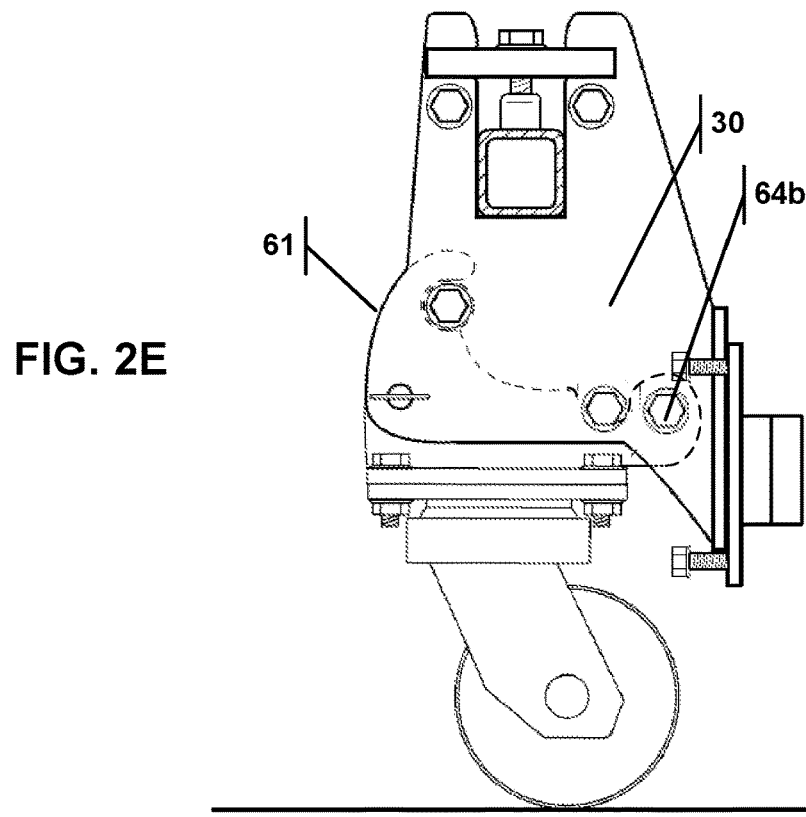
FIG. 2E illustrates the alternate swing frame plate installed on the swing caster assembly.

FIG. 2D is a silhouette of an alternate design from the swing frame parallel plates 61. This alternate plate 61 has similar features to the swing plate discussed above, including a swing axle notch 62, a swing stop notch 63 and a locking pin hole 115. The alternate plate, 61, however, also has a reinforcement hole 64a through which a reinforcement bolt 64b can be inserted (shown in FIG. 2E). The stationary frame parallel plates 30, would also have a corresponding and aligned hole such that the reinforcement bolt 64b could extend through the interleave plates, and optionally a nut fastened to the end of the bolt 64b. The reinforcement hole 64a and the bolt 64b strengthen the dolly while allowing for a more compact design.

To prevent the swing frame 55 from rotating, a locking pin 110 may be used. This provides greater safety when the wheel dolly 10 is in the raised configuration 155. The locking pin 110 may be disposed of in a corresponding pin hole 115 on the swing frame 55. This locking pin 110 may also have a locking pin spring 120 such that it remains in the unlocked position 135 (FIG. 3A) until the pin hole 115 passes by, allowing the locking pin spring 120 to drive the locking pin 110 into the pin hole 115, thereby placing the locking pin 110 in the locked position 140. In this fashion, the spring-loaded locking pin 110 automatically locks the wheel dolly 10. To release the spring-loaded locking pin 110, the user simply pulls on the locking pin 110. Altering the placement of the pin hole 115, or, as a non-limiting example, adding a second pin hole, would allow the dolly 10 to be locked in the lowered configuration 145 and/or the raised configuration 155.

Figure 4A:
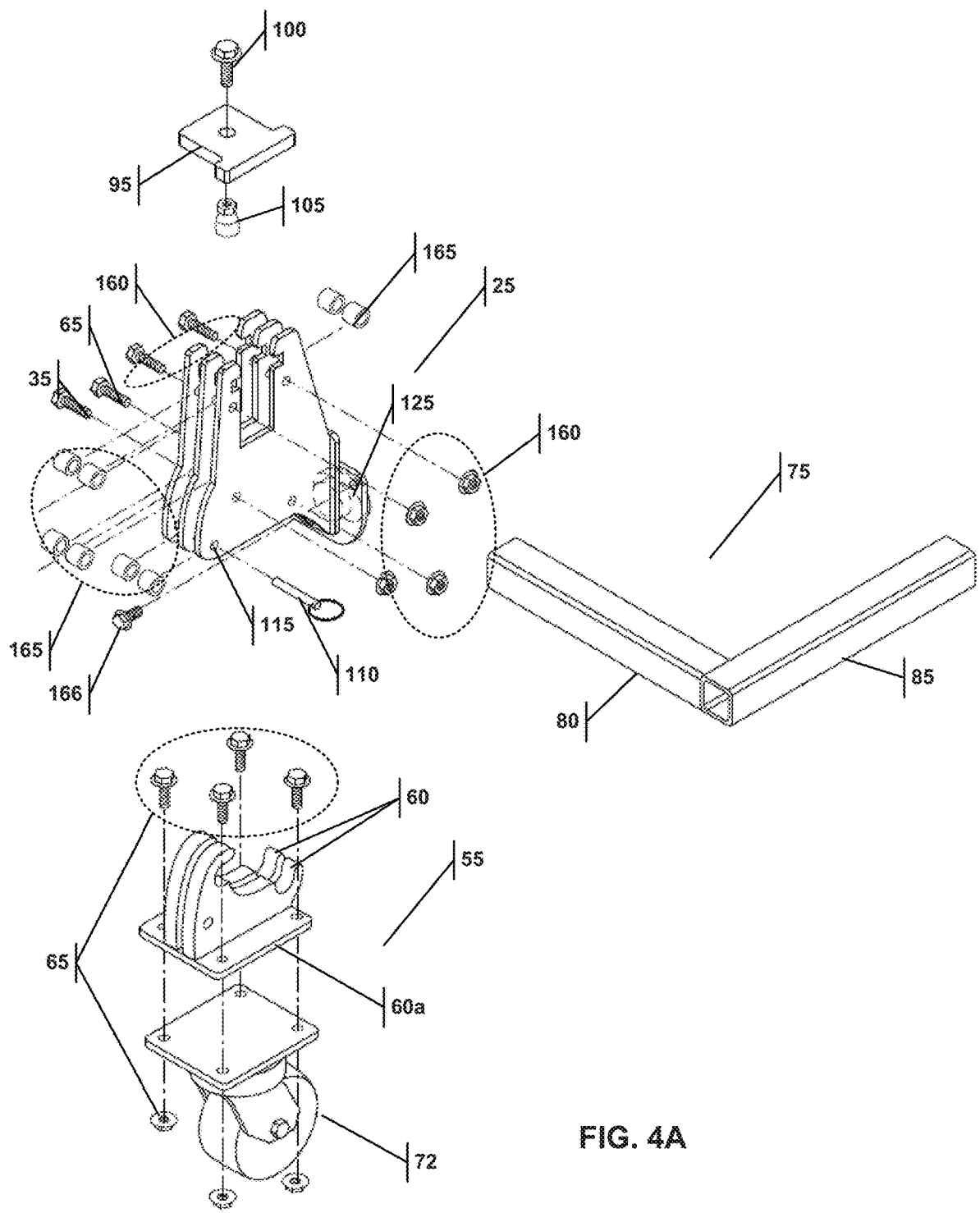
FIG. 4A is an exploded view of the caster assembly and lift bar.
Figure 4B:
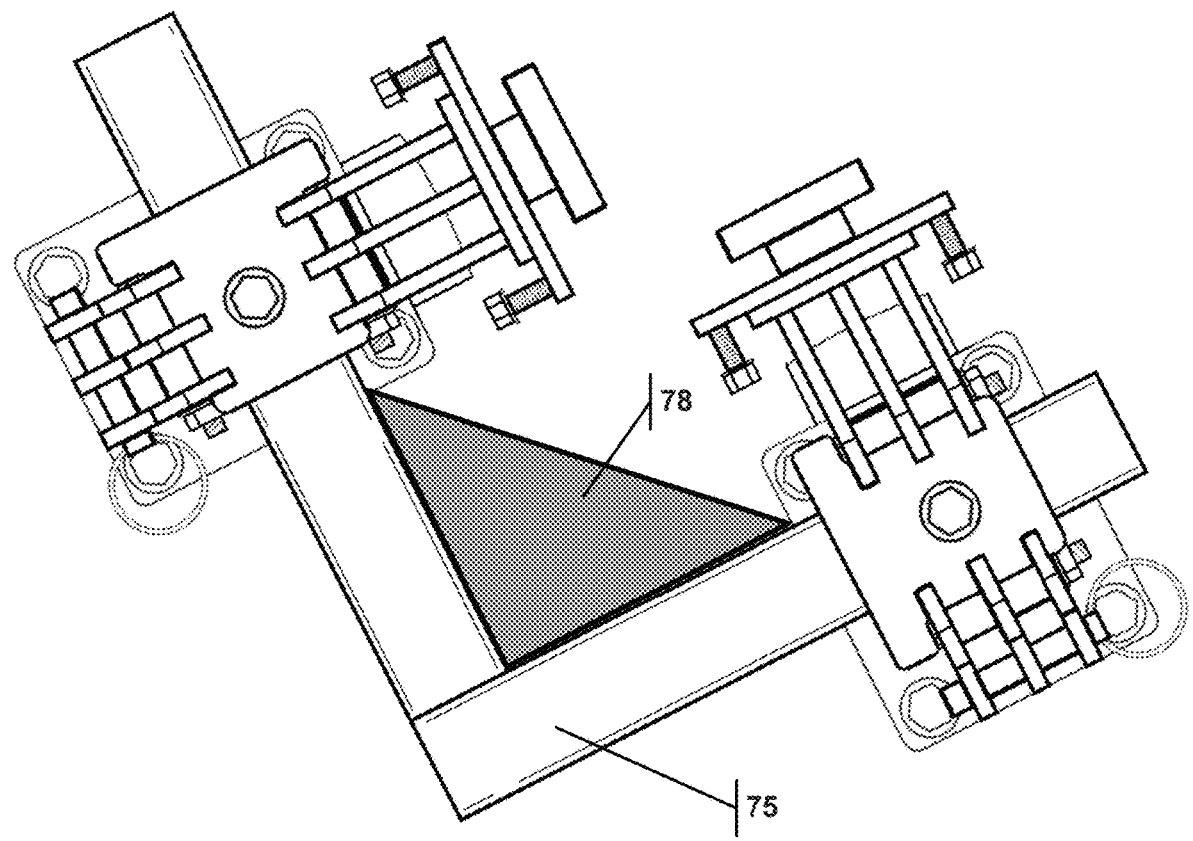
FIG. 4B illustrates a lift bar reinforced with a gusset plate.
Figure 4C:
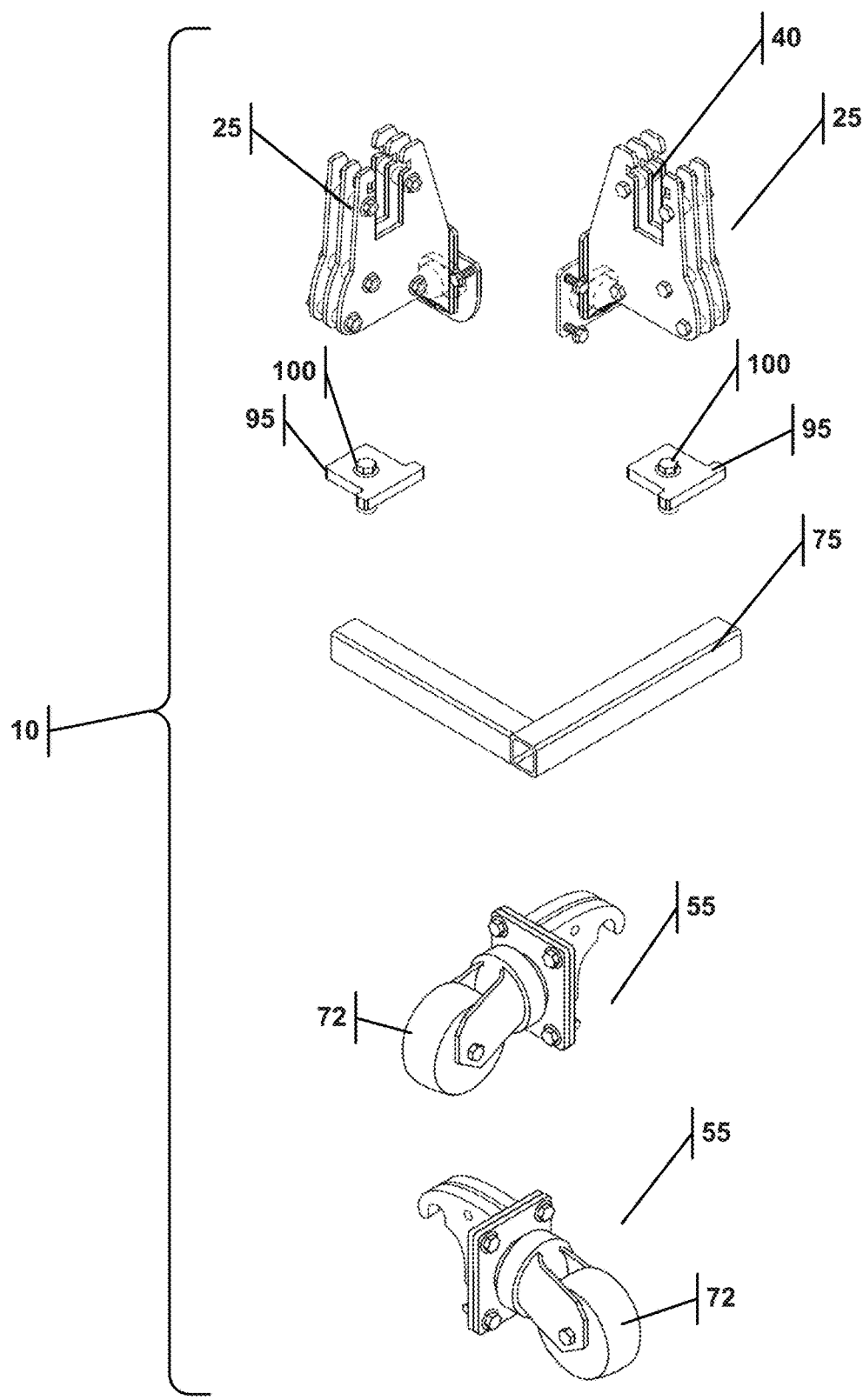
FIG. 4C illustrates the main components of the wheel dolly disassembled before installation on a corner mounting block of a cargo container.

FIG. 4A is an exploded view of the various parts of a preferred embodiment. While this is shown with swing casters bolts/nuts 160, permanent pins may instead be used to make the wheel dolly more rigid and stronger. Also, adding a gusset plate 78 to reinforce the lift bar 75, as shown in FIG. 4B, allows the lift bar 75 to support more weight. A lift bar without a gusset plate reinforcement may be sufficient to lift a small empty container (8,000 lbs. total or 2,000 lbs. per corner). However, larger applications like a fully-loaded cargo container would require a stronger lift bar. Adding the gusset plate that almost touches the two separated swing caster assemblies would allow for a caster rating of 20,000 lbs./caster or 40,000 lbs./corner or 160,000 lbs./container. FIG. 4C illustrates the main components of the wheel dolly 10 disassembled before installation on a corner mounting block of a cargo container, comprising a pair of stationary frames 25 with a lift bar channel slot 40, a pair of lift bar locking plates 95 with bolts 100, a lift bar 75, and a pair of swing frames 55 that have casters 72.

Figure 5A:
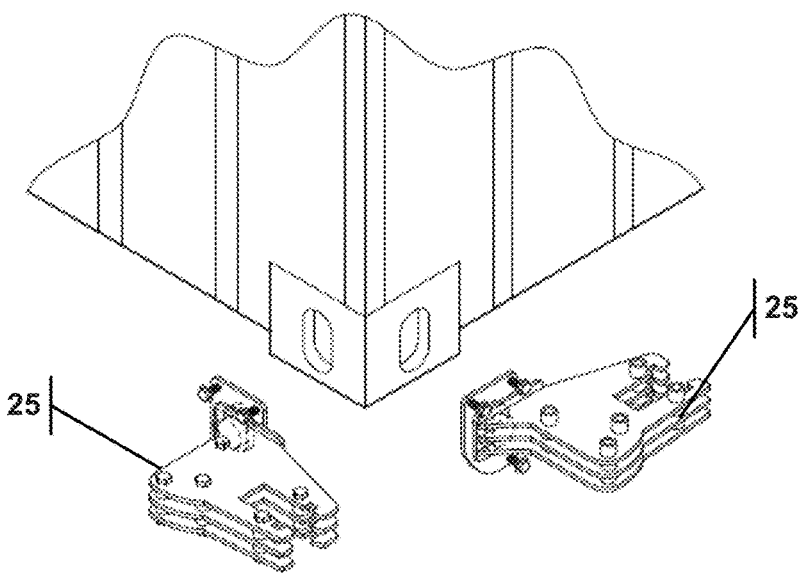
FIG. 5A illustrates the stationary frame placement and orientation prior to the insertion into the corner mounting block of the cargo container.
Figure 5B:
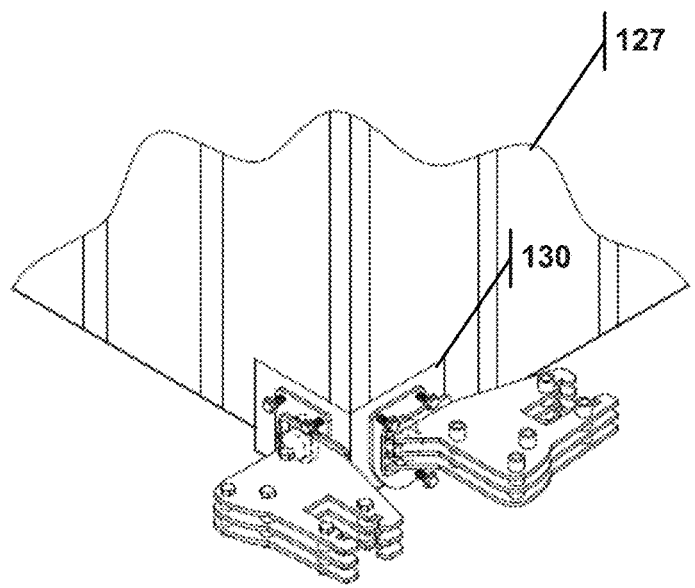
FIG. 5B illustrates the insertion of stationary frames into the corner mounting block of the cargo container.
Figure 5C:
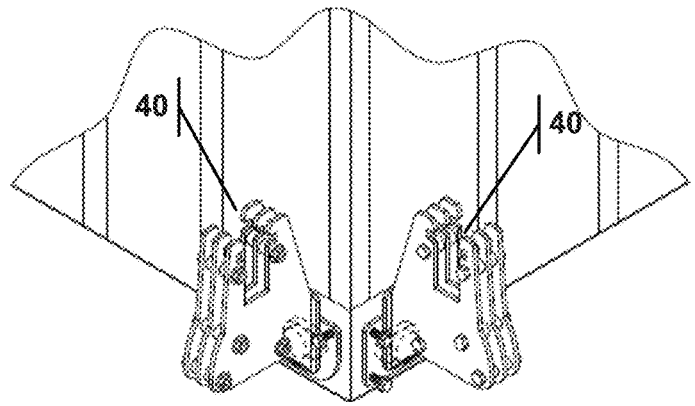
FIG. 5C illustrates the rotation of the stationary frames while inserted into the corner mounting block of the cargo container, thus locking the stationary frames thereto.
Figure 5D:
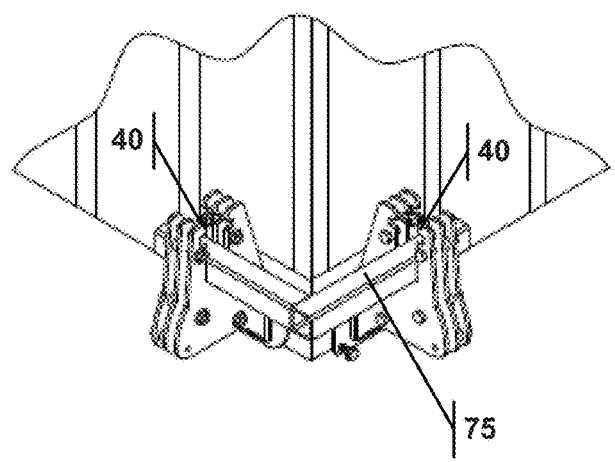
FIG. 5D illustrates the placement of the lift bar into the lift bar channel of each stationary frame.
Figure 5E:
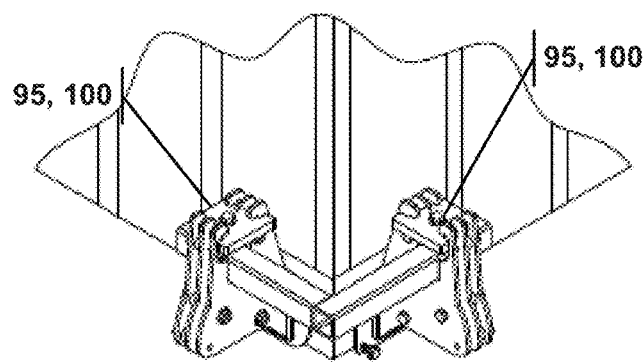
FIG. 5E illustrates how the locking plate and locking bolt fix the stationary frames to the lift bar.
Figure 5F:
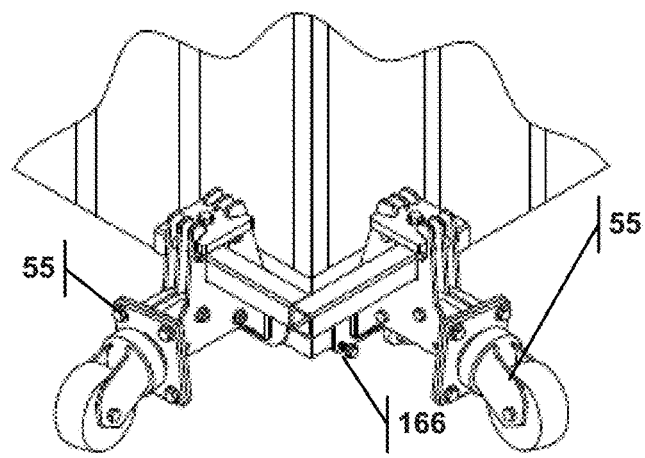
FIG. 5F illustrates the connection of the swing frame to the stationary frame while the stationary frame is locked to the corner mounting block of the cargo container.

Now focusing on FIGS. 5A-5L, the installation and operation of the wheel dolly 10 will be discussed. In FIG. 5A, each of the two stationary frames 25 are rotated 90-degrees, and their respected keyed nubs are inserted into the corner mounting block 130 of the cargo container 127, as shown in FIG. 5B. The two swing caster assemblies 15, 20 are then rotated back 90-degrees, as shown in FIG. 5C, with the lift bar channels 40 in the top position. This twisting locks the keyed nub into the slot mounting block slot 132. Now the swing caster assemblies 15, 20 can be locked onto the lift bar 75, as shown in FIGS. 5D and 5E, where the lift bar 75 is inserted into the lift channels 40, and the locking plate 95 is locked by tightening the locking plate bolt 100. In FIG. 5F, the swing frames 55 are hooked onto the swing axle (not shown), and the set screws 166 are tightened (in the preferred embodiment, each swing caster assembly has three set screws), which bite into the corner mounting block of the cargo container, adding to the stability of the wheel dolly 10. At this stage, the wheel dolly is fully assembled and mounted onto the corner mounting block of the cargo container and is in the lowered configuration and ready to receive the lifting force of an external jack.

Figure 5G:
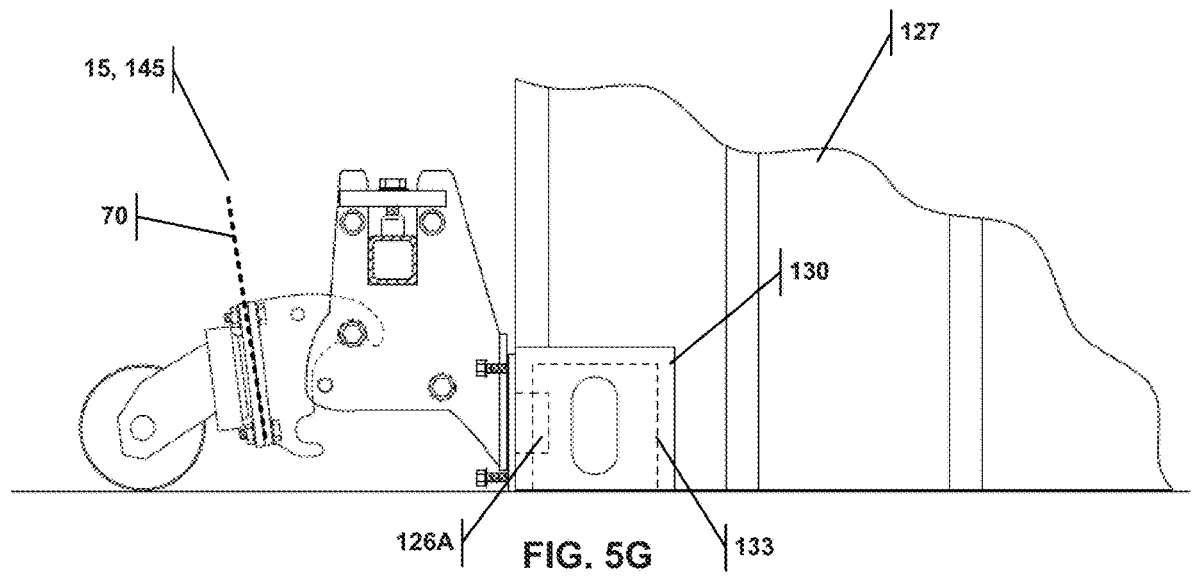
FIG. 5G is a side view of one of the swing caster assemblies in the lowered configuration and mounted to a cargo container mounting block.
Figure 5H:
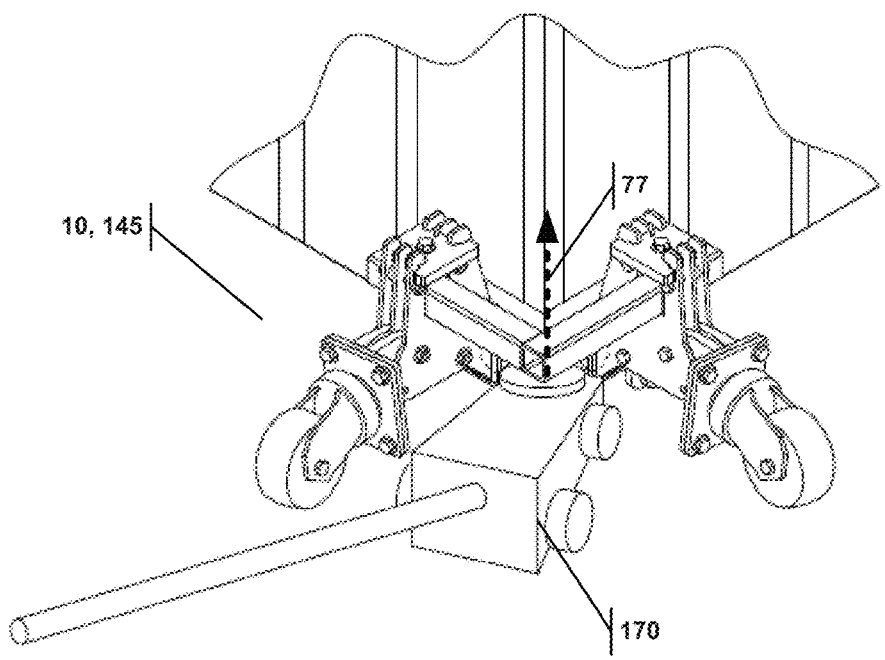
FIG. 5H illustrates a floor jack placed under the lift bar of the wheel dolly in a lowered configuration, wherein the floor jack exerts a lifting force on the lift bar.

FIG. 5G is a side view of one of the swing caster assemblies 15, 20 in the lowered configuration 145 and mounted to a cargo container mounting block 130. In this configuration, the swivel plane 70 of the swing caster assembly 15 is not parallel to the floor. It should be noted that FIG. 5G illustrates the interior surface 133 of the corner mounting block 130, and the flared portion 126A of the keyed nub 125 extends past this surface 133 and makes contact with this surface 133. FIG. 5H illustrates a floor jack 170 placed under the lift bar 75 of the wheel dolly 10 in a lowered configuration 145, wherein the floor jack 170 exerts a lifting force 77 on the lift bar 75.

Figure 5I:
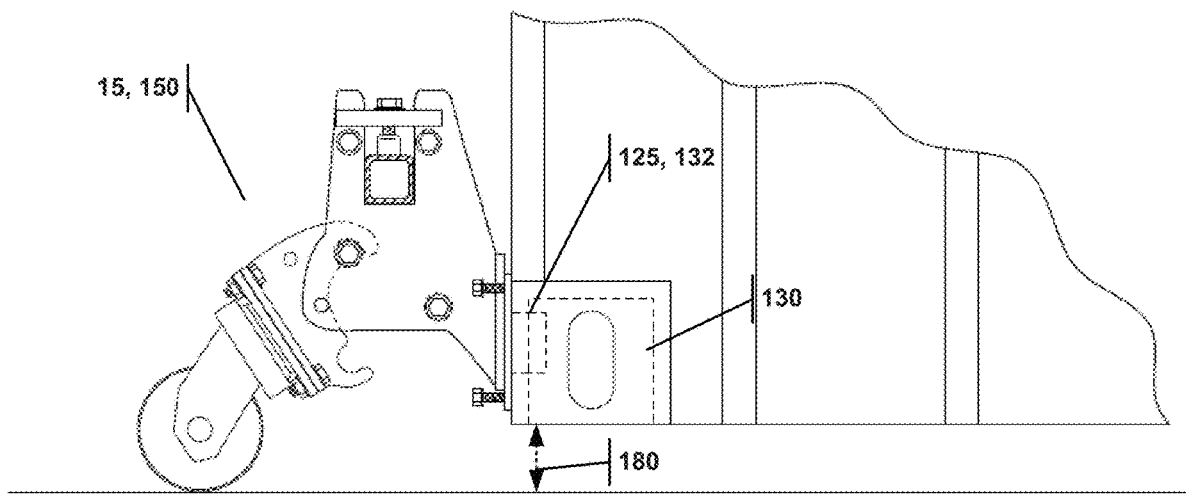
FIG. 5I is a side view of one of the swing caster assemblies in the intermediate configuration and mounted to a cargo container mounting block.
Figure 5J:
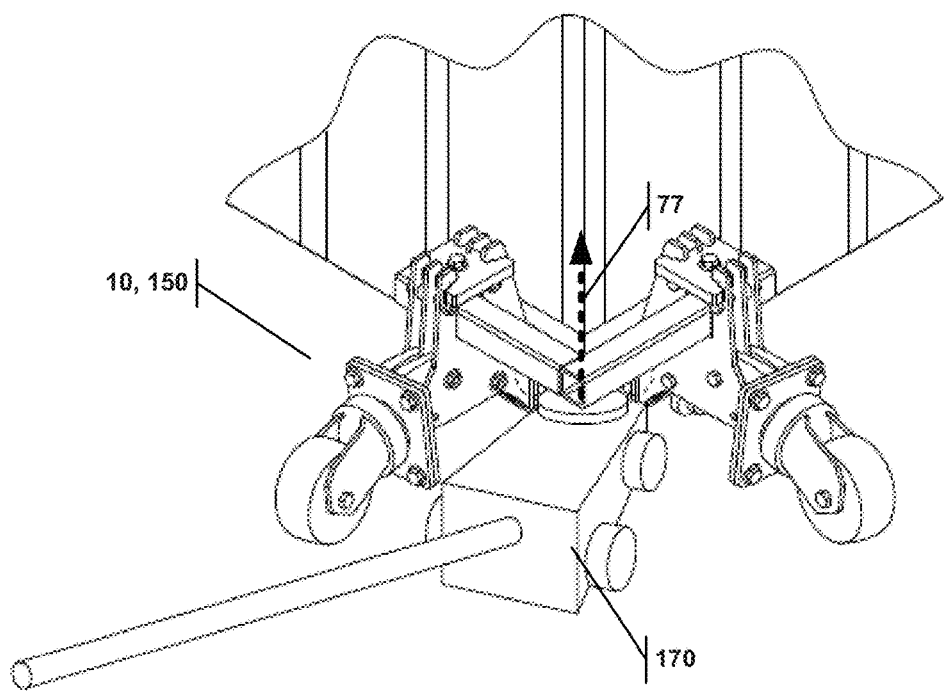
FIG. 5J illustrates a floor jack placed under the lift bar of the wheel dolly in an intermediate configuration, wherein the floor jack exerts a lifting force on the lift bar.

FIG. 5I shows a side view of one of the swing caster assemblies 15 in the intermediate configuration 150 and mounted to a cargo container mounting block 130. Here, the lifting force from the floor jack has raised the cargo container, resulting in a ground clearance 180. FIG. 5J illustrates a floor jack 170 placed under the lift bar of the wheel dolly 10 in an intermediate configuration 150, wherein the floor jack 170 exerts a lifting force 77 on the lift bar 75.

Figure 5K:
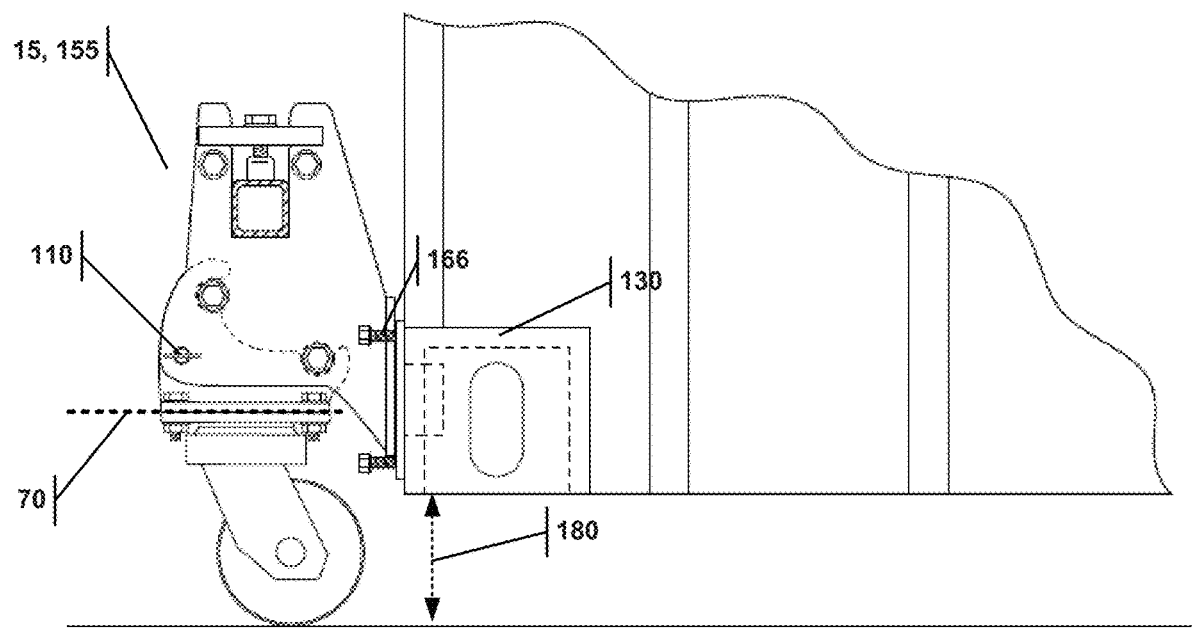
FIG. 5K is a side view of one of the swing caster assemblies in the raised configuration and mounted to a cargo container mounting block.
Figure 5L:
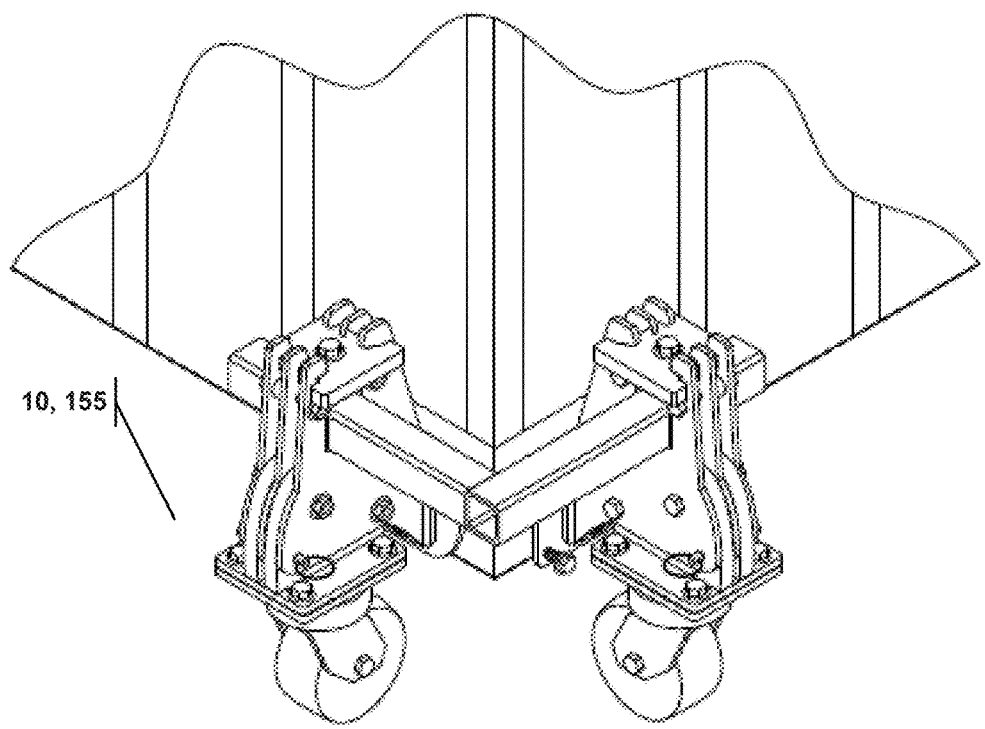
FIG. 5L illustrates the wheel dolly in the raised configuration and mounted to a cargo container mounting block.

Finally, FIG. 5K illustrates a side view of one of the swing caster assemblies 15 in the raised configuration 155 and mounted to a cargo container mounting block 130. In this configuration, the wheel dolly 10 has provided the cargo container with a greater wheel clearance 180, and the swivel plane 70 is parallel to the floor. Also, the locking pin 110 is inserted into the locking ping hole 115, preventing the wheel dolly 10 from inadvertently, and dangerously, collapsing. FIG. 5L shows the entire wheel dolly 10 mounted to the corner mounting block in a raised configuration 155.

Figure 6A:
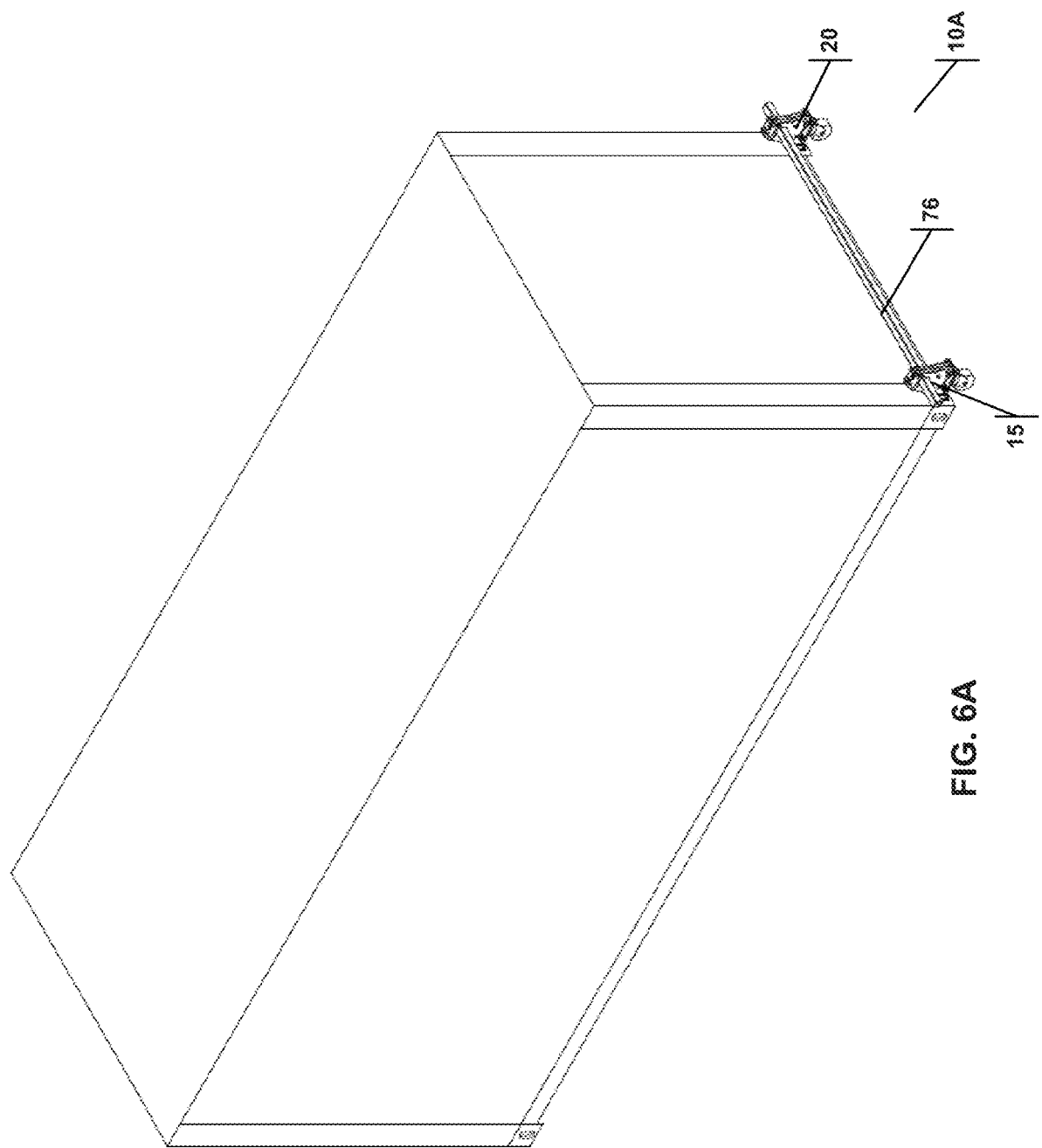
FIG. 6A illustrates the wheel dolly with a straight lift bar.

FIG. 6A illustrates the wheel dolly 10A with a straight lift bar 76 connected to a first and a second swing caster assembly 15, 20. The wheel dolly 10A operates in the same fashion as the dolly previously discussed. For example, the transition of the caster assemblies from the lowered, to an intermediate and ultimately to a raised configuration is shown in FIGS. 2A-2C. Instead of mounting the dolly 10A to a single corner block of the cargo container, the dolly 10A may mount to two separate locations on the same face of the cargo container. Mounting two such dollies 10A on parallel faces of the cargo container would allow for movement of the cargo container along the floor.

Figure 6B:
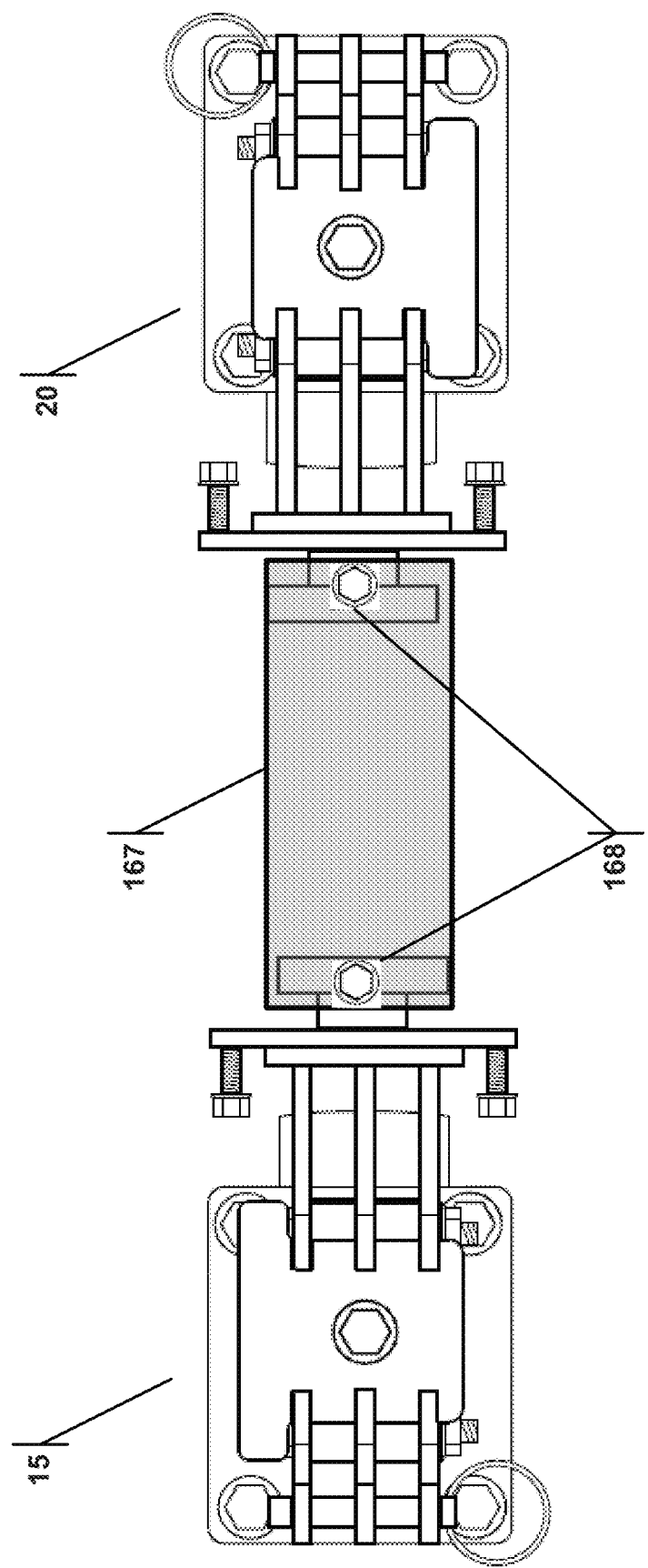
FIG. 6B illustrates a wheel dolly with a support connection bar configured to support a load.
Figure 6C:
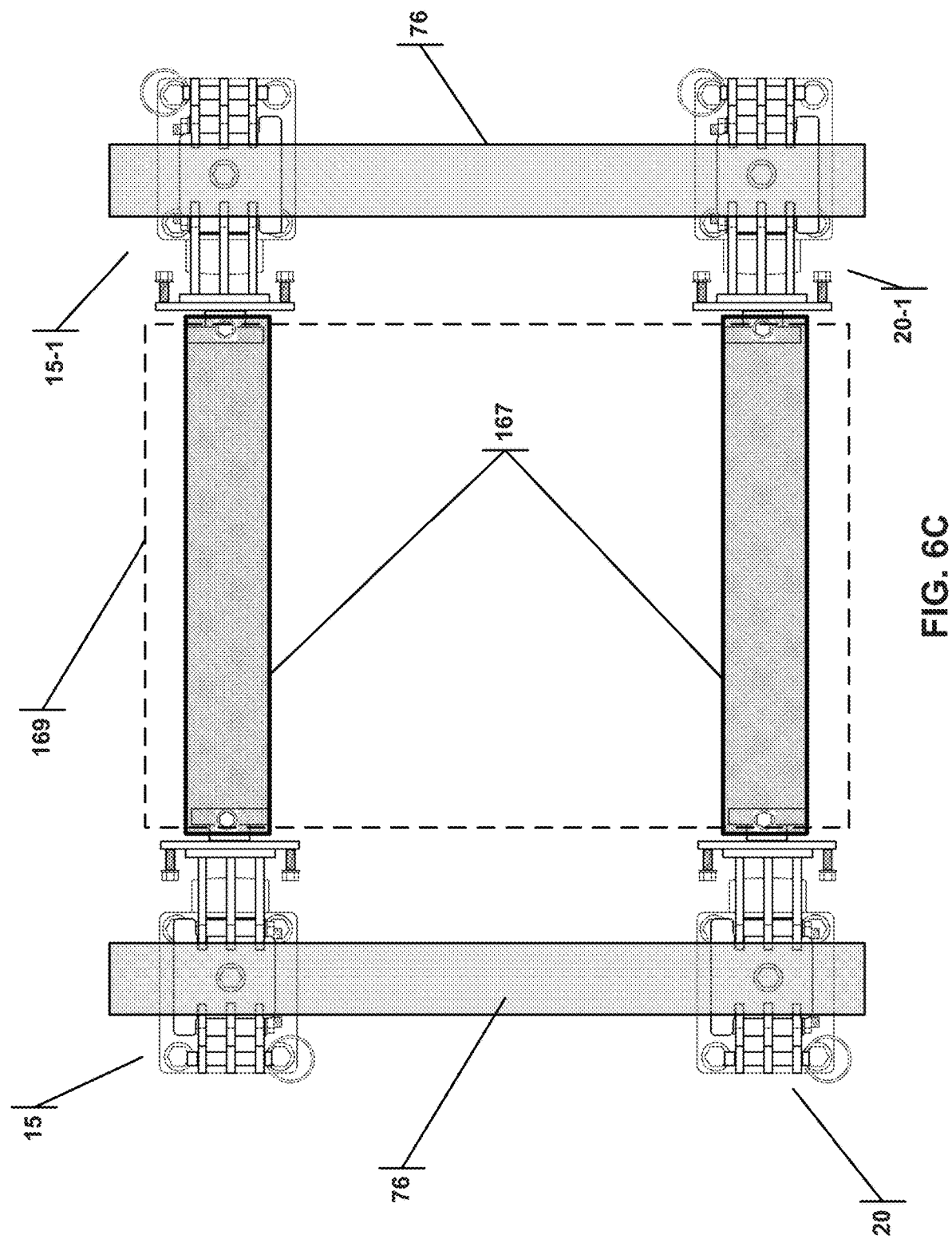
FIG. 6C illustrates a complete wheel dolly with two support connection bars.
Figure 7:
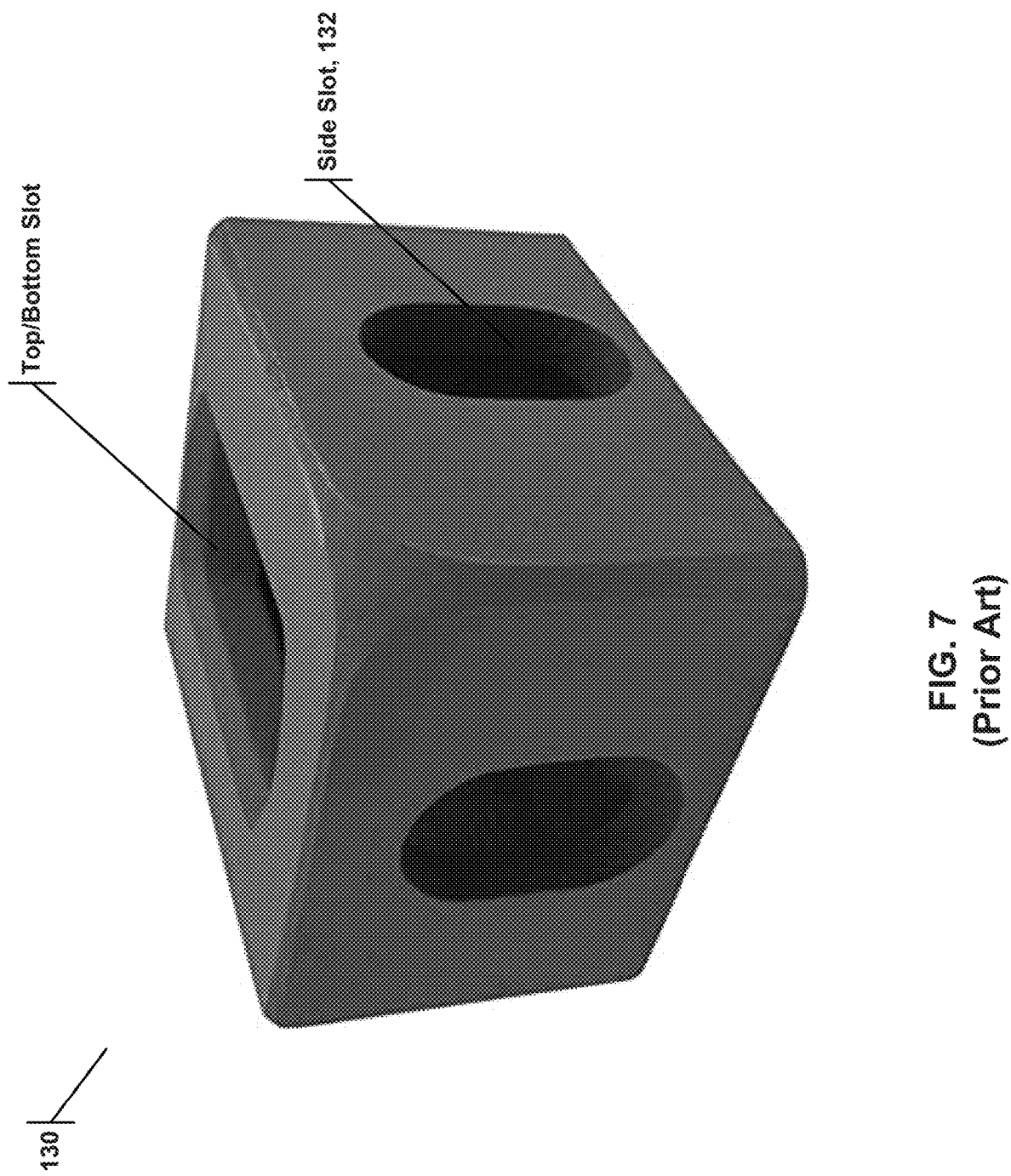
FIG. 7 illustrates a common corner mounting block used on a cargo container.

FIG. 6B illustrates a wheel dolly with a support connection bar 167 spanning between two swing caster assemblies 15, 20. The support connection bar 167 is configured to support a load, and is affixed to the swing cater assemblies by bolts 168. FIG. 6C illustrates the complete wheel dolly with a support connection bar 167—i.e., a first, second, third and fourth swing caster assemblies 15, 15-1, 20, 20-1, two support connection bars 167 and two straight lift bars 76. This dolly has a support area 169, which may be use to carry heavy objects such as safes and small containers with or without integrated corner mounting blocks. In operation, the support connection bars 167 are placed under the load, the swing casters can then be attached, then the lift bars can be attached to the pair of swing casters, and the lock plates can be tightened. An external floor jack can apply the lift force to one of the lift bars (for example the left side), allowing the first and second swing caster assemblies 15, 20 to transition to the raised configuration. The lock pin is inserted into both these swing caster assemblies to prevent collapse. The same operation is repeated for the other side (i.e., the third and fourth swing caster assemblies 15-1, and 20-1), until all the caster assemblies are in the raised and locked configuration. Now the object can be moved.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently-preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A wheel dolly comprising:
    a first and a second swing caster assembly, each swing caster assembly comprising:
        a stationary frame supporting a swing axle, the stationary frame comprising a lift bar channel;
        a swing frame constructed to rotate about the swing axle, thus defining a swing plane; and
        a caster connected to the swing frame;
    a lift bar comprised of a first longitudinal member extending orthogonally away from a second longitudinal member;
    wherein the first longitudinal member is connected to the lift bar channel of the first swing caster assembly, and the second longitudinal member is connected to the lift bar channel of the second swing caster assembly; and
    wherein the swing plane of the first swing caster assembly is orthogonal to the swing plane of the second swing caster assembly.

2. The wheel dolly of claim 1, wherein the lift bar is constructed to allow the first swing caster assembly to slide along the lift bar independently of the second swing caster assembly.

3. The wheel dolly of claim 2, wherein the first and second swing caster assemblies each further comprises a lift bar locking plate and a lift bar locking bolt, and wherein the locking plate and bolt are capable of locking the position of the swing caster assembly relative to that of the lift bar.

4. The wheel dolly of claim 3, wherein loosening the lift bar locking bolt allows the swing caster assembly to slide along the lift bar, and tightening the lift bar locking bolt fixes the position of the swing caster assembly relative to that of the lift bar.

5. The wheel dolly of claim 1, wherein the stationary frame is comprised of at least three parallel plates.

6. The wheel dolly of claim 5, wherein the three parallel plates are identical.

7. The wheel dolly of claim 1, wherein the swing frame is comprised of at least two parallel plates.

8. The wheel dolly of claim 7, wherein the stationary frame is comprised of at least three parallel plates, and wherein the two swing frame parallel plates are interleaved with the three stationary frame parallel plates.

9. The wheel dolly of claim 1, wherein the first and second swing caster assemblies each comprises a keyed nub adapted to be detachably fixed to a corner mounting block of a cargo container.

10. The wheel dolly of claim 1, wherein the first and second swing caster assemblies each comprises a locking pin that prevents the rotation of the swing frame relative to the stationary frame.

11. The wheel dolly of claim 10, wherein the locking pin is spring-loaded.

12. A wheel dolly for raising a cargo container containing a corner mounting block off of a floor or a horizontal surface by operation of an external jack that provides force in a direction orthogonal to the floor or horizontal surface, the dolly comprising:
    a first and a second swing caster assembly, each swing caster assembly comprising:
        a keyed nub adapted to be detachably fixed to the corner mounting block of the cargo container;
        a stationary frame supporting a swing axle, the stationary frame comprising a lift bar channel;
        a swing frame constructed to rotate about the swing axle; and
        a caster connected to the swing frame, the caster defining a swivel plane;
    a lift bar connected to both swing caster assemblies through the lift bar channel;
    wherein the wheel dolly can transition between two configurations:
        a lowered configuration, wherein the swivel plane is not parallel to the floor;
        a raised configuration, wherein the swivel plane is substantially parallel to the floor, and the keyed nub of each swing caster assembly is detachably fixed to the corner block;
        and wherein the transition between the lowered configuration and the raised configuration is achieved by the operation of the external jack to raise the lift bar.

13. The wheel dolly of claim 12, wherein the lift bar is comprised of a first longitudinal member extending orthogonally away from a second longitudinal member, and wherein the first longitudinal member is connected to the lift bar channel of the first swing caster assembly, and the second longitudinal member is connected to the lift bar channel of the second swing caster assembly.

14. The wheel dolly of claim 12, wherein the lift bar is constructed to allow the first swing caster assembly to slide along the lift bar independently of the second swing caster assembly.

15. The wheel dolly of claim 14, wherein the first and second swing caster assemblies each further comprises a lift bar locking plate and a lift bar locking bolt, and wherein the locking plate and bolt are capable of locking the position of the swing caster assembly relative to that of the lift bar.

16. The wheel dolly of claim 12, wherein the stationary frame is comprised of at least three parallel plates.

17. The wheel dolly of claim 12, wherein the swing frame is comprised of at least two parallel plates.

18. The wheel dolly of claim 17, wherein the stationary frame is comprised of at least three parallel plates, and wherein the two swing frame parallel plates are interleaved with the three stationary frame parallel plates.

19. The wheel dolly of claim 12, wherein the first and second swing caster assemblies each comprises a locking pin that prevents the rotation of the swing frame relative to the stationary frame.

20. The wheel dolly of claim 12, wherein the caster is a swivel caster.

21. A wheel dolly for raising a cargo container containing a corner mounting block off of a floor or a horizontal surface by operation of an external jack that provides force in a direction orthogonal to the floor or horizontal surface, the dolly comprising:

a first and a second swing caster assembly, each swing caster assembly comprising:

a keyed nub adapted to be detachably fixed to the corner mounting block of the cargo container;

a stationary frame supporting a swing axle, the stationary frame comprising a lift bar channel;

a swing frame constructed to rotate about the swing axle, the swing frame comprising a swing frame connection plate that defines a plane; and a caster connected to the swing frame connection plate;

a lift bar connected to both swing caster assemblies through the lift bar channel;

wherein the wheel dolly can transition between two configurations:

a lowered configuration, wherein the plane is not parallel to the floor;

a raised configuration, wherein the plane is substantially parallel to the floor, and the keyed nub of each swing caster assembly is detachably fixed to the corner block;

and wherein the transition between the lowered configuration, and the raised configuration is achieved by the operation of the external jack to raise the lift bar.

* * * * *